Sept. 8, 1942.  W. C. DENISON, JR  2,295,453
MACHINE FOR TESTING SPARK PLUGS
Filed Aug. 9, 1941  4 Sheets-Sheet 3

Inventor
WILLIAM C. DENISON JR.
By W. S. McDowell
Attorney

Sept. 8, 1942.  W. C. DENISON, JR  2,295,453
MACHINE FOR TESTING SPARK PLUGS
Filed Aug. 9, 1941  4 Sheets-Sheet 4
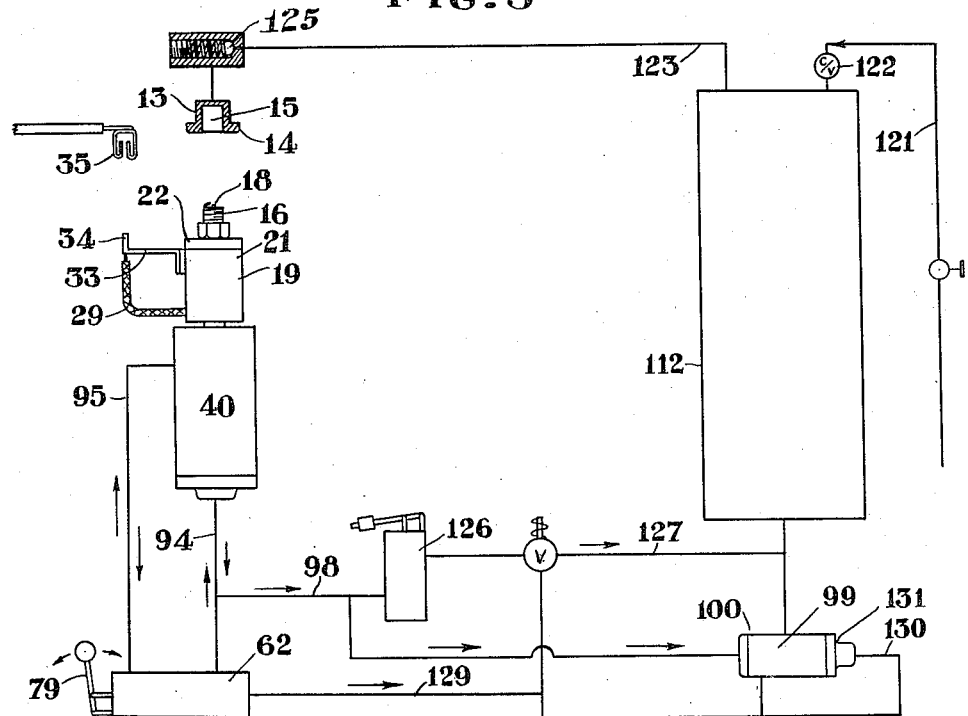
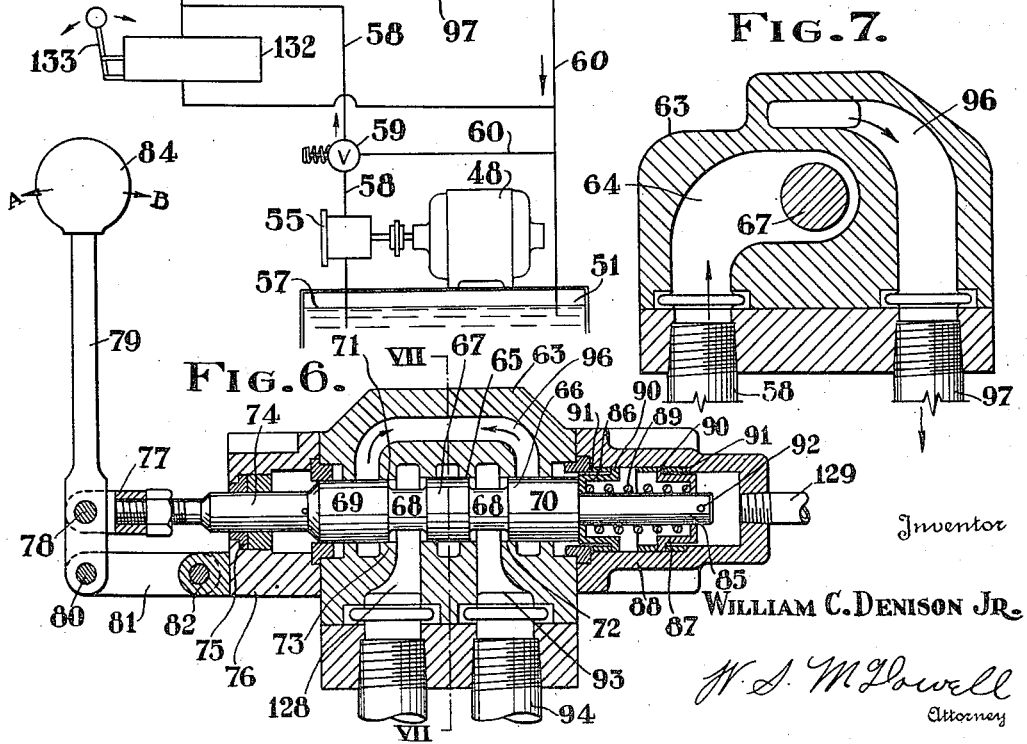
Inventor
WILLIAM C. DENISON JR.
W. S. McDowell
Attorney Patented Sept. 8, 1942

2,295,453

UNITED STATES PATENT OFFICE 2,295,453

MACHINE FOR TESTING SPARK PLUGS

William C. Denison, Jr., Columbus, Ohio, assignor to The Denison Engineering Company, Columbus, Ohio, a corporation of Ohio Application August 9, 1941, Serial No. 406,151

14 Claims. (Cl. 175—183)

This invention relates to an improved method and apparatus for testing spark plugs of the type employed as ignition devices for internal combustion engines.

In the testing of spark plugs, particularly those adapted for use in the engines of airplanes and, also, in other capacities, it is highly important that such spark plugs should be free from structural and electrical defects so that they will operate with maximum efficiency when placed in service. Merely testing such plugs in the open atmosphere, by passing electrical current therethrough, does not afford reliable observations. It is equally important that the plugs should be tested with the electrodes or terminals thereof in an atmosphere maintained under high pressure, that is, pressures of the kind which are developed in the cylinders of an internal combustion engine at the time ignition of a fuel mixture takes place. Under these conditions, it is possible to readily determine defects in spark plugs which would ordinarily pass unobserved.

To develop air pressures of the order of several hundred pounds above atmospheric and at the same time to provide for the rapid testing of such spark plugs with their terminals arranged in a pressure holding chamber presents a problem of considerable magnitude and, therefore, it is an object of the present invention to provide such apparatus, the same being characterized by its structural simplicity, ease and convenience in operation and reliable facilities for testing the fitness of each spark plug placed therein for the service for which it is intended.

Another object of the invention is to provide apparatus of this character wherein the electrodes of a spark plug to be tested are positioned in a small closeable chamber into which air under high pressure is admitted during the testing of the spark plug, enabling such testing operations to be carried out under pressure conditions similar to those which exist in the cylinders of an internal combustion engine in which such plugs or ignition devices are adapted to be used.

A further object of the invention resides in the provision of an economical and efficient hydraulic system, composed of a motor-driven pump, associated control valves and pipe lines, for operating an air compressor, the latter serving to supply air under high pressure but limited volume into the closeable testing chamber during each testing operation.

Still, a further object resides in the provision of a holder in which a spark plug to be tested is removably received, and to utilize fluid-actuated means to advance said holder and a spark plug carried thereby to a position in which the spark plug itself closes and seals the testing chamber, permitting air pressures to be developed in said chamber suitable for the desired testing operation.

For a further understanding of the invention, reference is to be had to the following description and the accompanying drawings, wherein is illustrated a single preferred embodiment of the invention.

In said drawings:

Fig. 5 is a diagrammatic view illustrating the controlled paths of fluid flow;

Fig. 6 is a vertical sectional view taken through one of the manually operated control valves;

Fig. 7 is a detail transverse vertical sectional view on the plane indicated by the line VII—VII of Fig. 6;

Figure 1:
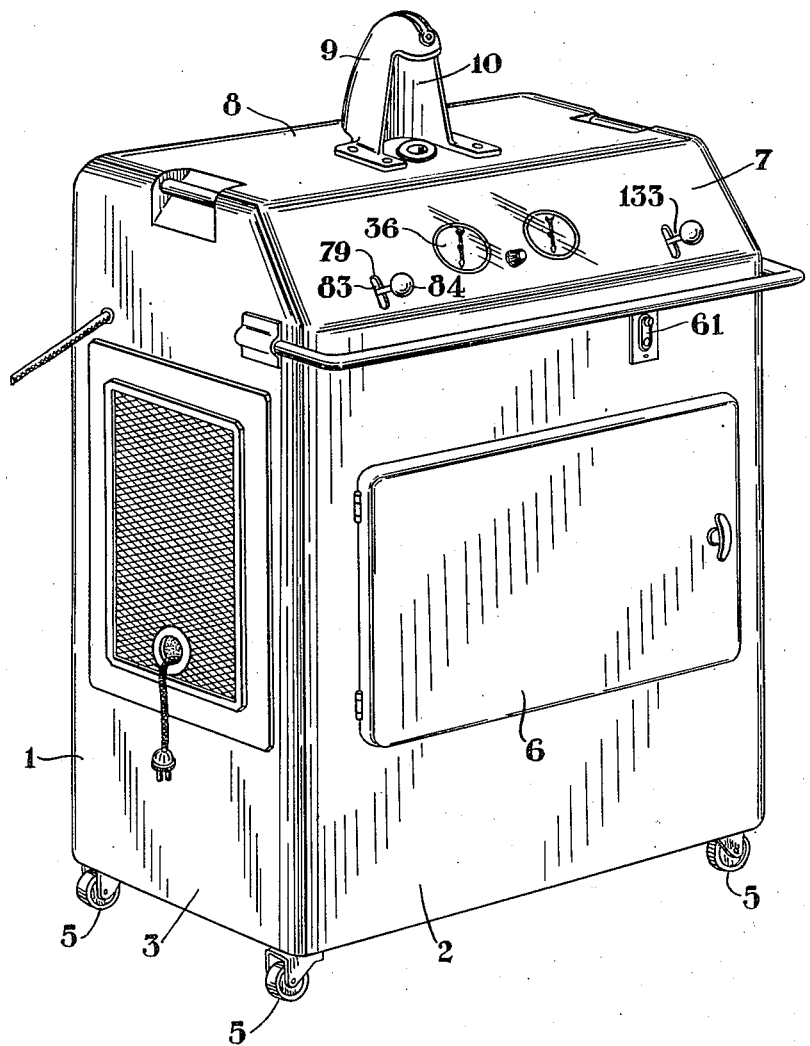
Fig. 1 is a perspective view of the improved spark plug testing machine forming the present invention.

Referring more particularly to the structural details of the machine, the numeral 1 designates the outer casing thereof. This casing may be of any suitable formation, but, in the form illustrated, comprises vertical front, side and rear walls 2, 3 and 4 respectively. Usually, the base of the casing is provided with rollers 5, so that the machine may be readily moved from place to place. The front wall is formed with an opening which may be covered by a hinged door 8, the latter providing convenient access to the interior of the casing. The upper portion of the front wall is inclined with respect to the vertical to provide a sloping instrument panel 7, in which may be arranged the various instruments, such as pressure gages, ammeters or voltmeters for enabling the results of spark plug tests to be visually and conveniently observed.

Figure 3:
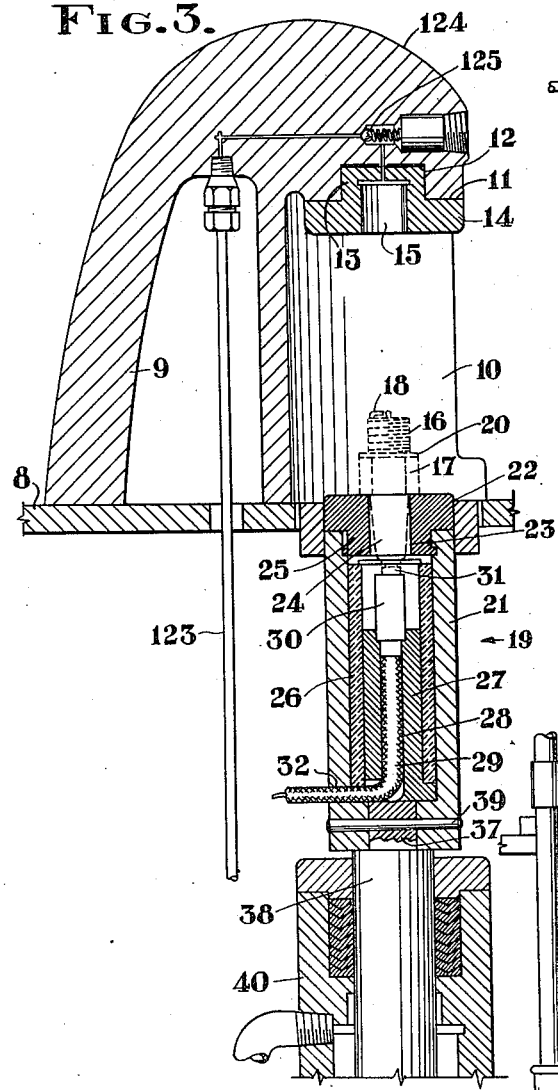
Fig. 3 is a detail vertical sectional view taken on the plane indicated by the line III—III of Fig. 2, showing more particularly the movable spark plug holder and the air pressure chamber.

Arising from the horizontal top wall 8 of the casing 1 is a stationary head 9. This head is formed with a vertically extending pocket 10, which is substantially semicircular in horizontal cross section, having a closed back and an open front. The upper end of the pocket 10 terminates in a horizontally disposed wall 11 in which is formed a circular socket 12 adapted to removably receive a boss 13 formed axially with a seating disk 14. As shown in Fig. 3, this disk is provided with an axially disposed open-ended chamber 15, which is proportioned to receive the threaded end 16 of a spark plug 17 and, also, the electrodes or terminals 18 of said spark plug. The disk 14 is preferably of an interchangeable type so that the machine may be readily adapted to spark plugs possessing different physical dimensions.

The spark plug is adapted to be removably positioned in a holder 19 when the latter occupies its lowered position, as in Fig. 3. Through means to be hereinafter described, the holder is elevated to cause the terminals 18 and the threaded end 16 of the spark plug to be positioned within the chamber 15. The seating gasket 20 of the spark plug is then firmly engaged with the edge surfaces of the chamber 15 around its open end, closing and sealing the chamber against fluid escape. When the spark plug is so positioned, air under high pressure is admitted into the chamber 15 and electrical current is passed through the spark plug, as will be presently explained, so that the same may be tested while its terminals are surrounded by air under super-atmospheric pressures of the order of several hundred pounds above atmospheric pressure. When the spark plug is positioned in the chamber 15, the latter possesses but limited volumetric capacity, so that but a very small volume of compressed air will be used or lost with each testing operation.

The holder 19 comprises a socketed member 21, and in the open upper end of this member, there is positioned an interchangeable disk 22, the latter being formed with an axial bore 23 in which is positioned the dielectric core or body 24 of the spark plug. The under surface of the disk 22 is shouldered so that it will seat on the upper edge surfaces of the member 21, and the disk is further provided with an axially depending boss 25, which is received within the open upper end of the member 21. The disk 22 is made to be interchangeable for the same reason as the disk 14, namely, so that the machine will be readily adapted to spark plugs of different dimensions. Within the socket member 21, there is disposed a sleeve 26 of porcelain or the like, which supports a bushing 27 having an axial passage 28 for the reception of a current conductor 29, the upper end of this conductor being joined with a yieldable contact member 30, which is maintained in resilient contact with the core terminal 31 of the spark plug 17.

The conductor 29 extends outwardly and laterally from the member 21 through a port 32 and, as shown in Fig. 5, is connected with a contact arm 33, suitably fixed to the side of the socket member. The outer end of the arm 33 terminates in an upwardly directed lip 34, which is adapted to be positioned between the yieldable sides of a stationary contact member 35 when the holder 19 has been elevated to position the terminal portion of the spark plug in the chamber 15. The contact member 35 is connected with a suitable source of electrical energy, so that when the lip 34 and the contact member 35 are in relative engagement, electrical current under a suitable potential will be passed through the spark plug to test its spark-producing properties and while such terminals are maintained in an atmosphere under high pressure. A voltmeter 36, mounted on the panel 7 may be included in this electrical circuit so that the electrical values of the completed circuit may be readily determined.

Figure 2:
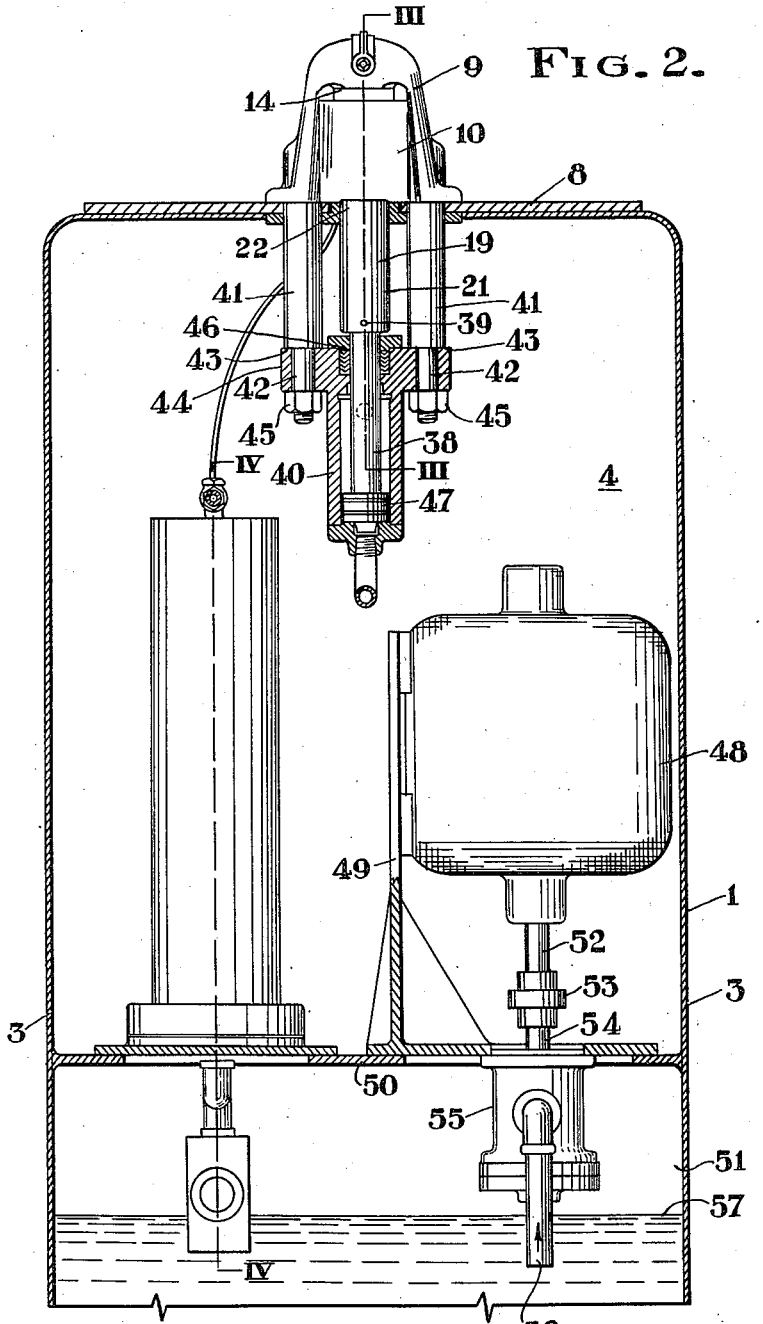
Fig. 2 is a vertical sectional view, partly in side elevation, taken through the casing of the machine and disclosing internal structure.

The lower end of the socketed member 21 is formed with an axial opening in which is received the reduced upper end 37 of a plunger 38, a cross pin 39 holding these parts in their proper relative order. As shown in Figs. 2 and 3, the plunger 38 is mounted for movement in a clamping cylinder 40, the latter being stationarily mounted within the casing 1. To support the cylinder, studs 41 depend from the head 9. The lower ends 42 of these studs are reduced in diameter, producing shoulders 43, against which is seated the flange 44 provided on the upper end of the cylinder 40. The ends 42 of the studs 41 are threaded for the reception of securing nuts 45, which retain the cylinder in its mounted position in connection with said studs. Also, the upper end of the cylinder 40 is provided with a stuffing box 46 through which the plunger 38 passes, the lower end of said plunger having mounted thereon a piston 47, which engages with the inner walls of the cylinder 40. By a means hereinafter described, liquid under pressure is admitted into and expelled from the ends of the cylinder 40, on opposite sides of the piston 47, to control the raising and lowering of said piston, its plunger 38 and the holder 19.

These fluid pressures are developed by the provision of an electric motor 48. The frame of this motor is secured to a bracket 49 stationarily mounted in the casing 1 in connection with the upper wall 50 of a liquid reservoir 51. The shaft 52 of the motor 48 is coupled as at 53 to the operating shaft 54 of a rotary vane-type pump 55, the barrel of this pump being connected with the bottom flange of the bracket 49 and disposed in the upper portion of the reservoir 51. The inlet pipe 56 of the pump 55 has its open end terminated beneath the liquid level 57 of the reservoir. When the pump is in operation, liquid is drawn into the inlet 56 thereof from the main body of liquid contained within the reservoir and, upon being discharged from said pump, passes through a pipe line 58, as shown in Fig. 5. In the pipe line, there is arranged a spring-loaded by-passing valve 59 which is set to automatically open when the pressures in the system associated with the pump reach a predetermined maximum, enabling the fluid to be returned to the reservoir through the pipe line shown at 60. The energizing circuit for the pump motor 48 includes a manually operated switch 61 which, as disclosed in Fig. 1, may be located so that it will be accessible for operation exteriorly of the casing 1.

After passing through the valve 59, the liquid continues its flow through the pipe 58 to the inlet side of a manually operated control valve 62. This valve, as illustrated in Figs. 6 and 7, comprises a casing 63 in which is arranged an arcuate oil inlet passage 64. The inner end of this passage is in communication with an axial bore 65 provided in the casing 63. Such communication, however, is normally arrested by means of a sliding spool-type valve member 66. The latter is provided centrally of its length with a cylindrical enlargement 67 which is slidably positioned in the bore 65 so that the flow of fluid from the passage 64 into the bore 65 is prevented. The enlargement 67 is of a length less than that of the bore 65. On opposite sides of said enlargement, the valve member is reduced in diameter to provide annular grooves 68. Beyond these grooves, the valve member is provided with enlargements 69 and 70, which normally close ports 71 and 72 formed in the internal divisional wall 73 of the casing 63.

Beyond the enlargement 69, the valve member is extended as at 74, slidably passing through a packed bearing 75 formed in a cap piece 76, which is suitably fastened to one side of the casing 63. The outer end of the extension 74 of the valve member is connected with a yoke 77, the bifurcated outer end of the latter being pivotally united as at 78 to a manually operated oscillatory lever 79. The lower end of this lever is pivoted as at 80 to the outer end of a link 81, the inner end of said link being pivoted as at 82 to the cap piece 76. The upper or outer portion of the lever 79 projects through a slot 83 provided in the panel 7, and is equipped with a knob 84 so that the lever may be conveniently grasped and rocked back and forth to slide the spool-valve 66, causing the latter to assume different operating positions.

The end of the spool-valve opposite to the lever 79 is provided with an extension 85 of reduced diameter. This extension passes through axial openings provided in a pair of oppositely facing cups 86 and 87 which are positioned for limited sliding movement in a bore of a bonnet 88, suitably connected with the valve casing 63. A coil spring 89 surrounds the extension 85 and is confined between cups 86 and 87, as shown in Fig. 6. Each of the cups is formed with an outwardly directed flange 90 which is adapted to engage with stationary stop elements 91 to limit the sliding movement of said cups in a desired direction. The cup 87 is held in contact with a pin 92 carried by the outer end of the extension 85. It will be seen that this spring arrangement is such that the spool-valve will be positively maintained in the normal or neutral position disclosed in Fig. 6, and that manual operation of the lever 79 is necessitated to move the valve 66 from its spring-retained normal or neutral position.

When the lever 79 is rocked in the direction indicated by the arrow A, the spool-valve will be slidably moved to cause the enlargement 67 thereof to occupy a position permitting of the flow of liquid under pump pressure from the inlet 64, through the right side of the bore 65 and thence into a passage 93 formed in the casing 63. This passage communicates with a pipe 94 leading, as shown in Fig. 5, to the bottom of the clamping cylinder 40, applying the pressure of the liquid so introduced into the clamping cylinder against the under side of the piston 47 and thereby elevating the spark plug holder assembly 19. The liquid contained in the cylinder 40 above the piston 47 is displaced and discharged through a pipe line 95 which extends back to the control valve casing 63, so that the displaced liquid may pass through an outlet passage 96 and thence through a pipe line 97 to the return line 60 and the reservoir 51.

To effect the compression of air and the delivery of such compressed air to the testing chamber 15, after the latter has been closed by the positioning of a spark plug to be tested therein, the pipe line 94 has leading therefrom a branch line 98. This line extends to the casing 99 of a pilot valve 100. The latter, as shown in Fig. 4, is arranged at the bottom of an air compressor 101.

The pilot valve includes an axial bore 102 in which is slidably mounted a spool-type valve 103. This valve is provided centrally with an annular groove 104, which is normally positioned in a port 105, establishing communication between offset drain passages 106 and 107, provided in the casing 99. The valve 103 is retained in this normal position by means of a coil spring 108, which forces the valve 103 in one direction, maintaining its outer end in contact with a closure plate 109 through which the line 98 enters. It will be seen that when fluid under pressure is first advanced to the clamping cylinder 40, a portion of the fluid is also diverted through the line 98 to move the valve 103 to a position closing the port 105 provided between the passages 106 and 107, and which passages provide for the drain of liquid from the air compressing cylinder 101 back to the reservoir 51. The pilot valve thus operates to introduce an element of delay in the operation of the air compressor, enabling the spark plug undergoing testing to be elevated into sealing contact with the chamber 15 prior to the delivery of compressed air or other elastic fluid to said chamber.

Figure 4:
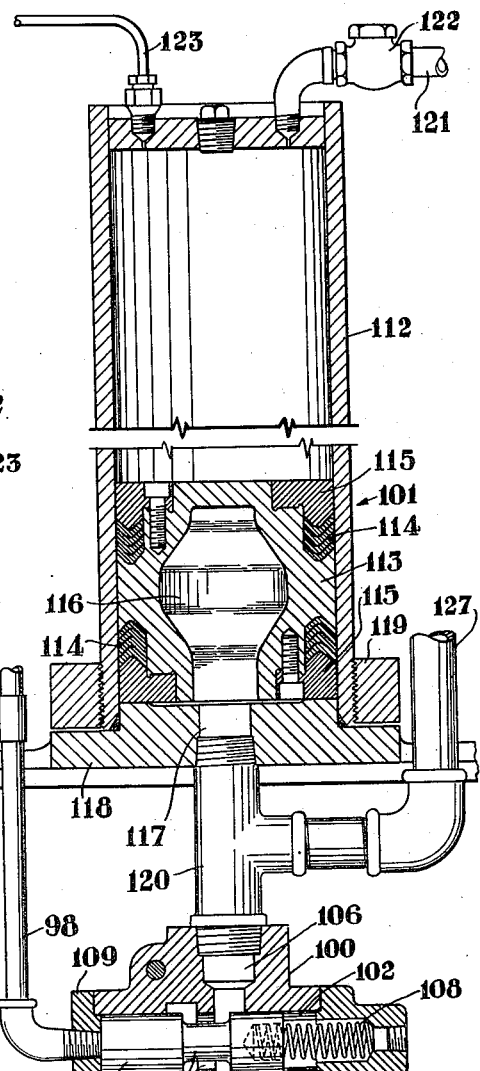
Fig. 4 is a vertical sectional view taken through the air compression cylinder and its associated pilot valve, the plane of the figure being indicated by the line IV—IV of Fig. 2.

The air compressor 101, as shown in Fig. 4, comprises a cylinder 112 arranged within the casing 1. Within this cylinder, there is slidably mounted a piston 113, the latter having side wall packing 114, which is held in a compressed state by means of clamping rings 115. Internally, the piston 113 is provided with a liquid-receiving pocket 116, which opens to the lower end of the piston in registration with a bore 117 provided in the base plate 118 for the cylinder 112, and into which base plate the lower end of the cylinder is threadedly received, as indicated at 119. The bore 117 communicates with a T-fitting 120 with which the pilot valve casing 99 is joined.

Air or other gas may be introduced into the top of the cylinder 112 by way of the valved pipe line 121, and the line 121 is provided with a check valve 122, providing for the flow of air or gas in but one direction through said line. When the piston 113 is elevated to compress air contained in the cylinder 112 above the piston, the check valve 122 is closed. The compressed air discharged from the upper end of the cylinder passes through a small diameter pipe line 123 which leads to the upper portion of the head 9, and by means of a restricted passage 124, communicates with the top of the chamber 15. A spring-loaded check valve 125 is arranged in the passage 124 and closes the latter when the pressures within the cylinder 112 are normal, for example, when said pressures do not exceed approximately 80 pounds per square inch, or less.

After the operation of the piston 47 of the clamping cylinder to bring the spark plug undergoing testing into closing engagement with the chamber 15, and the operation of the pilot valve 100 to close the port 105, increased fluid pressures within the pipe line 98 effect the automatic opening of a counter-weighted valve 126, shown in Fig. 5. The unseating of the valve 126 allows the actuating fluid under pump pressures to pass in part from the line 98 into a pipe line 127 which leads to the fitting 120 in the base of the air compressor. With the pilot valve also maintained in its position of closure, the pressures developed within the line 127 and applied to the under side of the piston 113, causes the elevation of this piston, compressing the air or other gas in the upper part of said cylinder and in the line 123. When the piston 113 reaches its limit of travel in an upward direction, the air pressures developed in the line 123 and in the chamber 15, after the check valve 125 has been unseated, may be of the order of 600 pounds or more per square inch.

It will be noted that with the use of the check valve 125, when the holder 19 descends and also the piston 113, but a relatively small amount of compressed air will be lost with each charging operation and such loss will be limited to the relatively small amount of compressed air introduced into the chamber 15.

After the desired testing of a spark plug has been effected, the lever 79 is moved in the direction of the arrow B, positioning the spool valve 66 so that the operating liquid, under pressure of the pump 25, will flow from the inlet passage 64 into the passage 128. The enlargement 70 of the valve 66 is moved to a position uncovering the port 72, so that liquid returning from the bottom of the clamping cylinder 40 through the line 94 may travel through the outlet passage 96, and the line 97 to the reservoir 51. The positive advancement of liquid through the pipe line 95, introduces the liquid under pressure into the top of the cylinder 40, causing the forcible descent of the piston 57, the displacement of the liquid beneath it, and the lowering of the holder 19. The reduced liquid pressures which obtain at this time in the line 98 cause the valve 103 to move under the influence of its spring 104 to its open position as shown in Fig. 4, thereby enabling the liquid in the cylinder 112 beneath the piston 113 to be discharged through the fitting 120 and passages 106 and 107 and returned to the liquid reservoir. This permits of the descent of the piston 113, aided by the air pressures in the cylinder 112 above the piston. The spring assembly 89 of the manually operated valve 108 and of the pilot valve operate in oil. Pipe connections 129 and 130 are joined, respectively, with the bonnet 88 and the closure cap 131 of the pilot valve to return excess oil to the reservoir 51.

A second manually operated valve 132 has been shown in Fig. 5. This valve corresponds in structure and function to the control valve 62. However, the use of the valve 132 is optional. It is preferably employed as a safety measure, and includes an operating lever 133, which corresponds to the lever 79 of the valve 62. Thus with the use of the valve 132, both hands of the machine operator are required to simultaneously operate the control levers 79 and 133 of the valves 62 and 132. This fact prevents the operator from being injured by carelessly or otherwise placing his hand in the path of movement of the spark plug as the same is being elevated into contact with the disk 14. From a strictly functional standpoint, however, the valve 132 could be omitted. Both levers 79 and 133 have their operating portions arranged in slots provided in the sloping instrument panel 7, where they are conveniently accessible.

The air or other gas introduced into the upper end of the cylinder 112 by way of the pipe line 121 may be under superatmospheric pressure if desired. It will be seen that to operate the machine, it is necessary merely to insert the spark plug to be tested into the socket of the holder 19 and to then actuate the control levers 79 and 133, movement of said levers in one direction causing the elevation of the holder and the spark plug carried thereby into contact with the disk 15, and in the opposite direction to cause the descent of the holder. The testing, therefore, may be carried out with very considerable rapidity and accurate results. It will be understood that while but a single holder has been illustrated, a plurality of such holders may be used to test a number of spark plugs at the same time.

Figure 8:
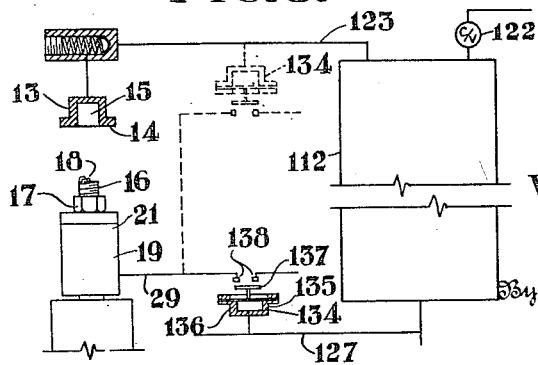
Fig. 8 is a diagrammatic view illustrating a portion of the paths of fluid flow with a modified type of switch means for automatically introducing testing current to the spark plugs after the same have been clamped in the proper position.

In Fig. 8, the fluid flow system has been illustrated with a fluid pressure operated switch 134 for controlling the introduction of current to the spark plug being tested. The switch 134 includes a hollow casing 135 with a member 136, such as a diaphragm, which is movable upon the introduction of fluid under pressure into the casing to cause a bar 137 to engage spaced contacts 138 and complete a circuit to the spark plug 17. The switch is arranged in the line 127 through which oil is introduced into the air compressing cylinder 112. As the fluid is precluded from flowing to the cylinder 112 until the plug 17 has been moved into secure engagement with the disk 14, the current will only be supplied to the plug at the proper time.

If desired, the switch for controlling current flow to the plug could be operated by compressed air and, in that event, it would be connected, as indicated in dotted lines in Fig. 8, in the line 123 extending from the air compressing cylinder to the chamber 15. The current could then only be supplied to the plug when the electrodes of the plug were placed under fluid pressure.

In view of the foregoing, it will be seen that the present invention provides relatively simple, inexpensive and compactly arranged apparatus for expeditiously testing spark plugs to determine their physical and electrical properties under pressure conditions. The apparatus eliminates the necessity of employing heavy air compression apparatus and associated storage tanks, all parts being grouped in a small compact casing, which, because of its portability, may be placed in various advantageous locations.

What is claimed is:

1. Apparatus for testing engine spark plugs, comprising a body having an open-ended testing chamber formed therein, a holder in which a spark plug to be tested is removably positioned, hydraulic means for moving said holder and a spark plug carried thereby to a position in which the electrodes of the spark plug are disposed in said chamber and with the body of the spark plug maintained in pressure contact with the open end of said chamber to seal the latter against fluid escape, and an air compressor actuated by said hydraulic means for introducing air under superatmospheric pressure into said chamber when the latter is closed by a spark plug.

2. Apparatus for testing engine spark plugs, comprising a body having an open-ended testing chamber formed therein, a holder in which a spark plug to be tested is removably positioned, fluid-pressure means for moving said holder and the spark plug carried thereby to a position in which the electrodes of the spark plug are disposed in said chamber with the body of the spark plug maintained in pressure contact with the open end of said chamber in order to seal the latter against fluid escape, and a gas compressor actuated by said fluid pressure means for introducing a gas under superatmospheric pressure into said chamber when the latter is closed by a spark plug.

3. Spark plug testing apparatus comprising a body having a chamber formed therein, hydraulic pressure means for maintaining the electrode bearing portion of a spark plug in said chamber, means for passing electric current through said spark plug when the same is positioned in said chamber, and means for introducing a gaseous fluid into said chamber under superatmospheric pressures when a spark plug is positioned therein.

4. Apparatus for testing engine spark plugs comprising: a body having an open-ended testing chamber formed therein, a holder in which a spark plug to be tested is removably positioned, a cylinder, a piston slidably mounted in said cylinder and connected with said holder, a motor driven pump, a reservoir containing a body of liquid in which the inlet of said pump is submerged, a pipe line extending from the discharge side of said pump to said piston, and a manually operated valve for controlling the flow of liquid through said pipe line.

5. Apparatus for testing engine spark plugs comprising: a body having an open-ended testing chamber formed therein, a holder in which a spark plug to be tested is removably positioned, a cylinder and piston slidably mounted in said cylinder and connected with said holder, a motor driven pump, a reservoir containing a body of liquid in which the inlet of said pump is submerged, a pipe line extending from the discharge side of said pump to said piston, a manually operated valve for controlling the flow of liquid through said pipe line, an air compressor having a cylinder, a piston arranged in said cylinder, a pipe line extending from said cylinder to said chamber, a pipe line connected with the discharge side of said manually operated valve and leading to said cylinder, and automatic valve means communicating with said last-named pipe line for introducing a liquid under the pressures of said pump into said cylinder following the positioning of a spark plug in said chamber to cause the movement of the piston in said cylinder, whereby to compress an elastic fluid and advance such compressed fluid to the spark pluk testing chamber.

6. Apparatus for testing engine spark plugs, comprising a body having an open-ended testing chamber formed therein, a holder in which a spark plug to be tested is removably positioned, fluid-actuated means for moving said holder and a spark plug carried thereby to a position in which the electrodes of the spark plugs are disposed in said chamber and with the body of the spark plug maintained in pressure contact with the open end of the chamber, such contact being sufficient to seal the chamber against fluid escape, a gas compressor actuated by said fluid pressure means for introducing a gas under superatmospheric pressure into said chamber following the closing of the latter by a spark plug, and means for passing a testing electric current through said spark plug when the latter is positioned in said chamber and with the electrodes thereof subjected to said gas pressure.

7. In apparatus for testing engine spark plugs, a portable casing, a body mounted on the top of said casing, said body having an open-ended testing chamber formed therein, a holder in which a spark plug to be tested is removably positioned, hydraulic pressure generating means arranged within said casing for moving said holder and a spark plug carried thereby to a position in which the electrodes of the spark plug are disposed in said chamber and with the body of the spark plug maintained in pressure contact with the open end of said chamber to seal the latter against fluid escape, a gas compressor arranged within said casing actuated by said pressure generating means for effecting the introduction of a gas under superatmospheric pressure into said chamber when the latter is closed by a spark plug, a manually operated control valve for governing the action of said fluid pressure means, and means for passing an electric testing current through a spark plug positioned in said chamber.

8. In spark plug testing apparatus, a body having an open-ended testing chamber formed therein, a holder in which a spark plug to be tested is removably positioned, a cylinder, a piston arranged within said cylinder and directly connected with said holder, a liquid reservoir, a motor-driven pump having its inlet submerged in the liquid of said reservoir, a pipe line leading from the outlet of said pump to said cylinder, a manually operated control valve positioned in said pipe line for governing the flow of liquid from said reservoir under the pressures of said pump to said cylinder, a second pipe line leading from said valve to said cylinder and communicating with the latter on the opposite side of the piston therein with respect to said first-named pipe line, and a return pipe line leading from said valve to said reservoir.

9. In spark plug testing apparatus, a casing, a liquid holding reservoir positioned in said casing, a motor-driven pump arranged within said casing and having the inlet thereof submerged in the liquid of said reservoir, a manually operated control valve, conduit means leading from the discharge side of said pump to said valve, a spark plug holder having a stem, a piston connected with said stem, a cylinder in which said piston is slidably mounted, a pipe line leading from said valve to said cylinder on one side of said piston, a second pipe line leading from said valve to said cylinder and communicating with the interior of the latter on the opposite side of said piston as regards said first-named pipe line, a valve member disposed in said valve and operable upon manual actuation to selectively control the flow of fluid under pump pressures to said clamping cylinder, and a body having an open-ended chamber in which the electrode-bearing end of a spark plug carried by said holder is adapted to be positioned.

10. In spark plug testing apparatus, a body having an open-ended testing chamber formed therein, a movable holder in which a spark plug to be tested is removably positioned, means for moving said holder and a spark plug carried thereby to a position in which the electrodes of the spark plug are disposed in said chamber and with the body of the spark plug maintained in pressure contact with the open end of said chamber to seal the latter against fluid escape, a gas compressor comprising a cylinder having a piston movably mounted therein, means for admitting a gaseous fluid into said cylinder on one side of said piston, a liquid holding reservoir, a motor driven pump having its inlet submerged in the liquid of said reservoir, a pipe line leading from the discharge side of said pump to said cylinder and communicating with the latter on one side of said piston, valve means in said pipe line for governing the flow of liquid under pressure therethrough, and a pipe line leading from the gas-compressing side of said cylinder to said testing chamber.

11. Apparatus for testing spark plugs comprising a portable cabinet, a head rigidly mounted on the top of said cabinet, a replaceable disk carried by said head, said disk having an open-ended testing chamber formed therein, a movable holder, a disk replaceably carried by said holder provided with an axial opening, said opening being adapted for the reception of a spark plug to be tested, fluid-actuated means for moving said holder with a spark plug supported thereby so that the electrode-bearing portions of the spark plug will be received within said socket and with the body of the spark plug maintaining seating contact with the marginal edges of the open end of said chamber, a fluid conveying passage formed in said body and leading to said chamber, and means for passing a gaseous fluid under super-atmospheric pressure through said passages and into said chamber when the latter is sealed by a spark plug undergoing testing.

12. Apparatus as set forth in claim 11 in combination with a spring-loaded check valve in said passage.

13. In spark plug testing apparatus, a head having an open-ended, plug-receiving chamber, positioning means for retaining the electrode-carrying end of a spark plug in said chamber and to close the open end of the latter against fluid escape, means operative following the positioning of a spark plug in said chamber to charge the latter with a compressible fluid under pressure, said latter means including a restricted fluid passageway leading to said chamber from a fluid-pressure source, and a check valve positioned in said head closely adjacent to said chamber and operative to automatically arrest fluid flow to said chamber when the fluid pressure in said passageway falls below a predetermined value.

14. Portable self-contained spark plug testing apparatus, comprising a cabinet, a stationary head located on the top of said cabinet, said head having a spark plug-receiving chamber formed therein, an air compressor mounted within said cabinet, conductor means for transmitting air under pressure from said compressor to said chamber, and a normally closed valve positioned in said head adjacent to said chamber for controlling air travel through said conductor means.

WILLIAM C. DENISON, Jr.